Nov. 1, 1938.　　　　E. J. DUNHAM　　　　2,134,687
DRIVE AXLE CONSTRUCTION
Filed Sept. 13, 1937　　　3 Sheets-Sheet 1

Inventor
Elmer J. Dunham
By Walter E. Schirmer
Atty.

Nov. 1, 1938.     E. J. DUNHAM     2,134,687
DRIVE AXLE CONSTRUCTION
Filed Sept. 13, 1937     3 Sheets-Sheet 3
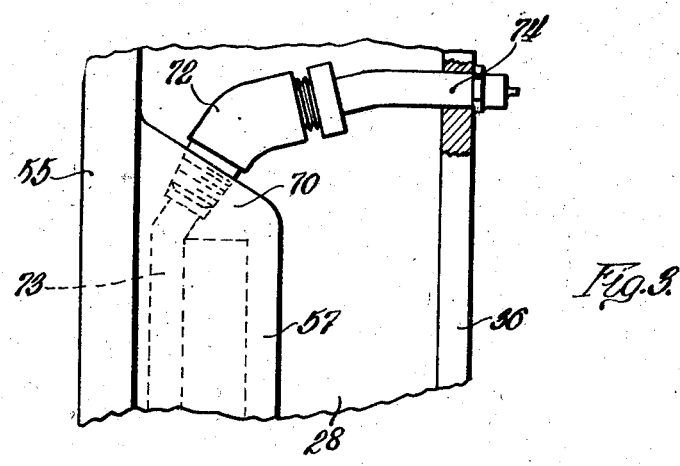
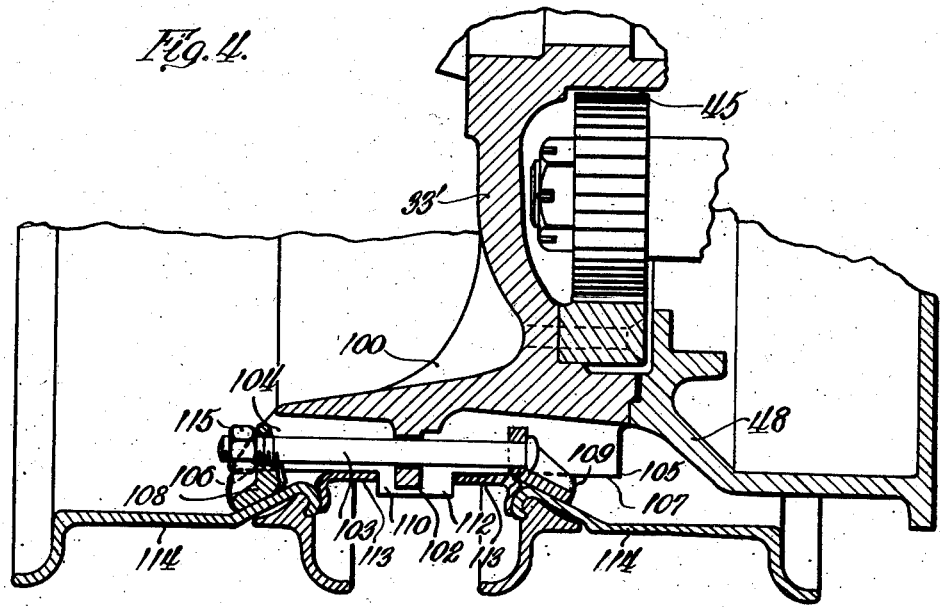
Inventor
Elmer J. Dunham
By Walter E. Schirmer
Atty Patented Nov. 1, 1938

2,134,687

UNITED STATES PATENT OFFICE 2,134,687

DRIVE AXLE CONSTRUCTION

Elmer J. Dunham, Battle Creek, Mich., assignor to Clark Equipment Company, Buchanan, Mich., a corporation of Michigan Application September 13, 1937, Serial No. 163,572

12 Claims. (Cl. 180—75)

This invention relates to rear axle constructions, and more particularly to rear axle constructions in which the wheel has an internal gear drive from a jack shaft carried by the rear axle housing. Such axle constructions are employed to a considerable extent in trucks and tractors, especially for moving relatively heavy loads at low speeds, and in cases where additional gear reductions are necessary.

It has heretofore been quite a considerable problem to incorporate into such rear axle constructions suitable brake means that will have the necessary characteristics and yet will be enclosed in such manner as to prevent the entrance of mud, dirt, and the like.

Another requirement of such constructions which has not been adequately met in previous structures with which I am familiar is the necessity of affording proper lubrication for the bearings and gears of such a unit while at the same time eliminating any possibility of such lubricant passing into the brake drum or into contact with the braking surfaces.

The difficulties in assembling and dis-assembling previous types of such units, which may be necessary for inspection and maintenance of the unit, present in previous constructions, has also been a source of considerable objection.

It is a primary object of the present invention to provide an internal gear drive axle construction which will overcome the disadvantages and objections of the prior types of structure, and which at the same time will be economical in manufacture, easy to assemble and compact and simple in design.

One feature of the present invention is the provision, in an axle structure of this type, of an enclosed expanding type brake, which is sealed from the internal gear and bearing housing in such manner as to prevent lubricant from entering the interior of the brake assembly. At the same time, the brake assembly is also externally shielded from water, dirt and the like. This eliminates the necessity for a transmission brake or a brake on the jack shaft.

Another feature of the present invention resides in the design of the structure whereby the wheel, tire, internal ring and brake drum can all be assembled into one unit, and may then be applied as a unit over the outer end of the jack shaft to complete the assembly. Thus for inspection or repair it is only necessary to remove the wheel and the entire mechanism is laid open for repair or replacement.

Other objects and advantages of the present construction will be more apparent from the following detailed description which, taken in conjunction with the accompanying drawings, will disclose to those skilled in the art the particular construction and operation of a preferred form of the present invention.

In the drawings:

Figure 3 is a detail view of the manner of lubricating the jack shaft bearings; and Figure 4 is a sectional view showing a modified type of wheel mounting.

Figure 1:
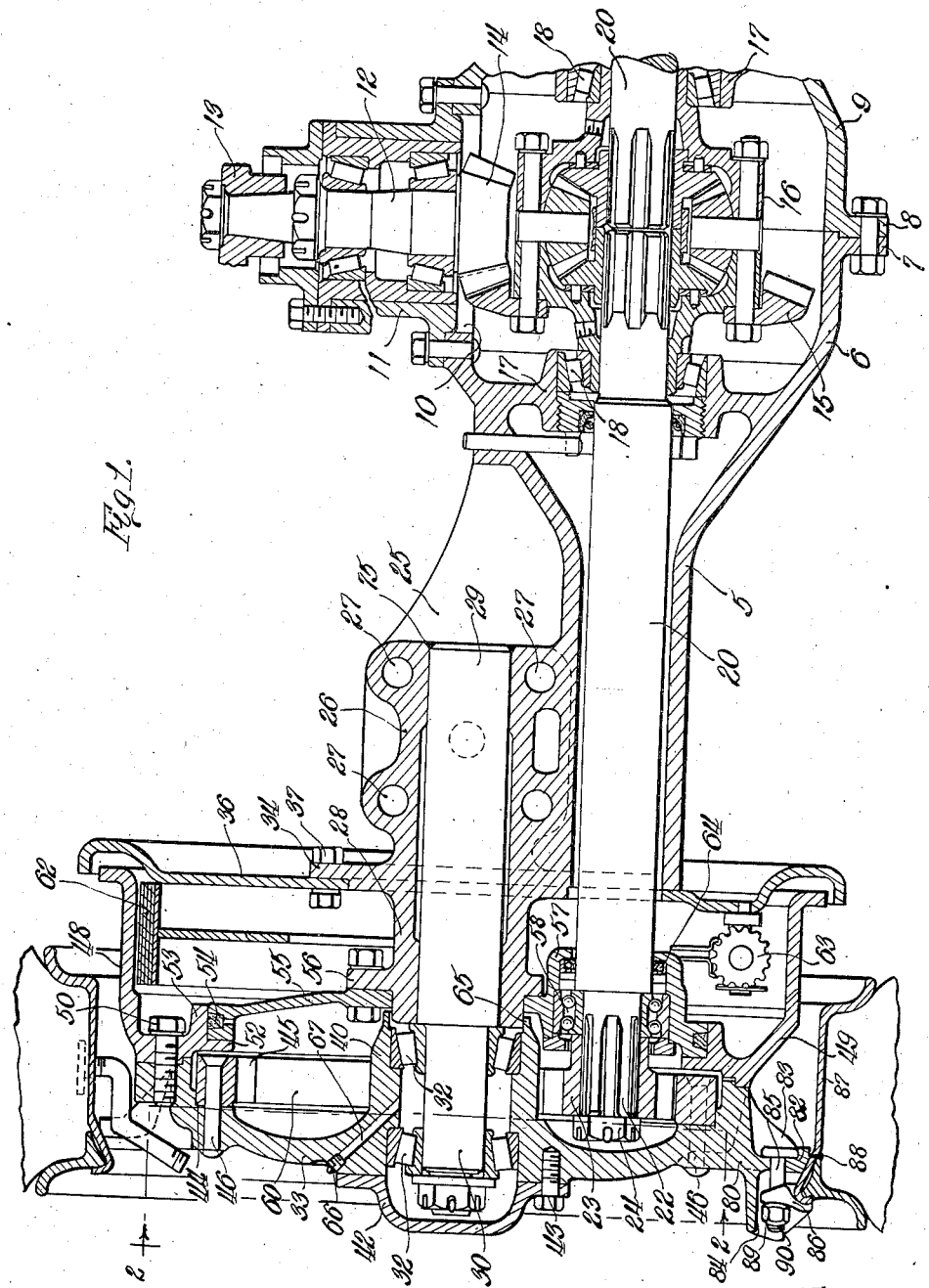
Figure 1 is a longitudinal sectional view through a portion of the rear axle construction embodying the present invention.
Figure 2:
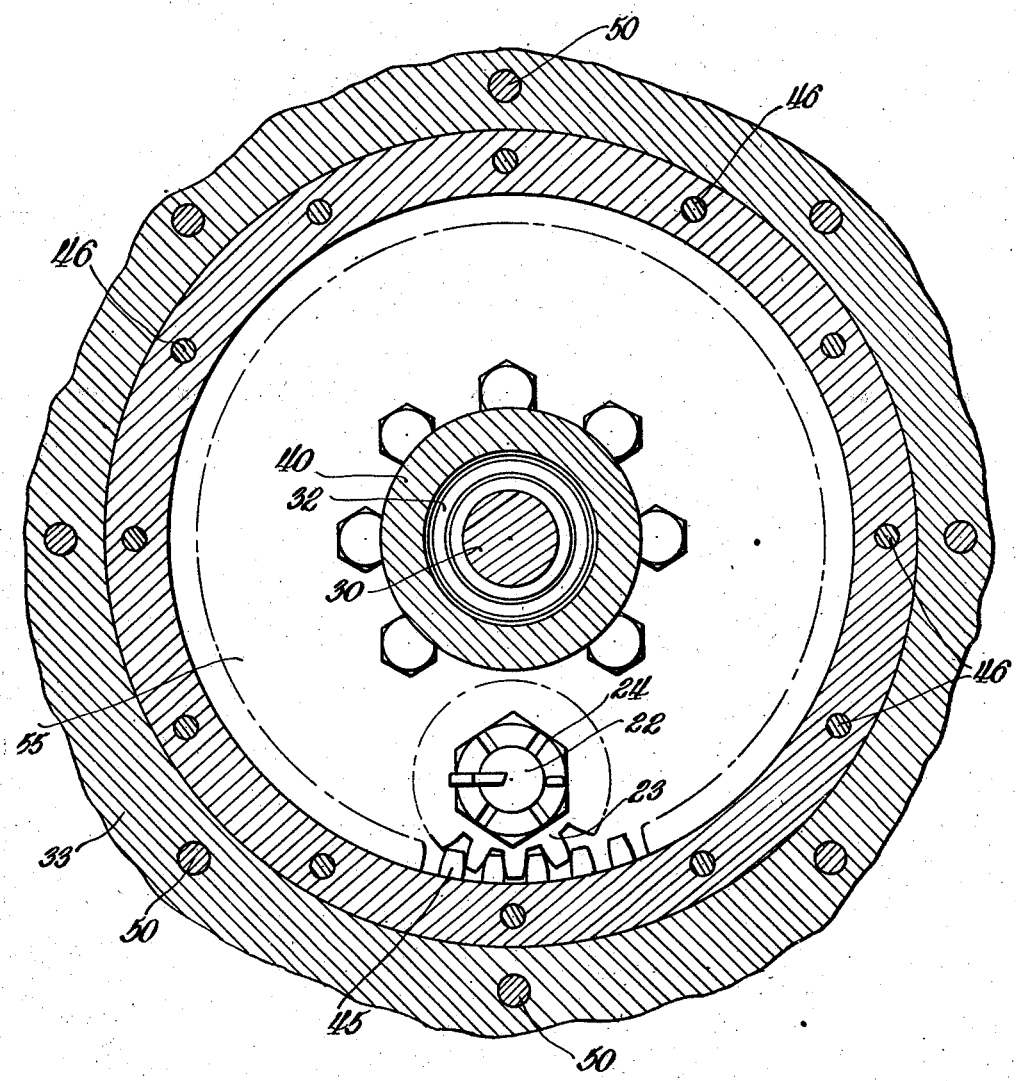
Figure 2 is a sectional view taken substantially on line 2—2 of Figure 1.

Referring now in detail to the drawings, an axle housing is indicated generally at 5. This housing has a bell-shaped portion 6 provided with the flange 7 adapted to be piloted in and bolted to a corresponding flange 8 of the opposite housing arm 9. The housing arms 5 and 9 are provided with cooperating portions forming an opening 10 adapted to receive the member 11 which forms a bearing supporting nose for the pinion shaft 12.

The pinion shaft 12 is connected at its outer end to a suitable torque transmitting member by means of the coupling yoke 13, and at its inner end is provided with the pinion gear portion 14 which has meshing engagement with the ring gear 15 of a differential case 16 supported within the belled ends of the housing arms. Each of the housing arms 5 and 9 is provided with an internal web portion 17 forming a journal support for the bearings 18 on which the hub portions of the differential case 16 are mounted for rotation. Extending through the housing arms 5 and 9 are axle spindles 20 which have splined engagement in the differential case 16, and which, at the outer ends, are provided with splined portions 22 adapted to receive the driving pinion 23 secured thereon by means of the nut 24.

Each of the housing arms 5 and 9 is provided with an offset flange portion 25 terminating in a bearing spring pad 26 suitably apertured as at 27 to receive bolts for clamping a spring thereto, and having an extending nose portion 28 which forms suitable supporting means for a stub shaft 29 extending through the bracket 25 and having a reduced outer end 30 upon which are mounted stub bearings 32 for supporting a wheel assembly 33 thereon.

The arm 5 is also provided with a radially extending flange portion 34 adjacent its outer end, which flange portion provides a suitable pilot for mounting the brake closure plate 36 thereon as by means of bolts 37.

Considering now the wheel 33, this wheel has a hub portion 40 fitting over the bearings 32, and is provided with a suitably formed end wall adapted to receive the hub cap 42 secured thereto by means of bolts 43. On its periphery the wheel is provided with a shouldered recess 44 in which is seated the ring gear 45 having the internal teeth adapted to be driven from the pinion 23. The ring gear is preferably assembled to the wheel body by means of rivets 46.

Also secured to the inboard side of the wheel body radially outwardly of the piloting recess 44 is a brake drum 48 which has a radially inwardly extending flange portion 49 bolted to the wheel body by means of the bolts 50, and is provided with a radial inwardly extending flange 52 forming with the annular flange 53 a lubricant seal pilot which, when the wheel is assembled in position, is engaged by the felt packing strip 54 carried by the sealing plate 55.

The plate 55 at its inner periphery is bolted to the flange 56 formed on the extending nose portion 28 of the housing 5, and which is provided with an offset bearing cup 57 fitting about the periphery of the shaft 20 and adapted to provide a bearing seat for the bearings 58 which support the shaft for rotation in the cup 57 and thereby support the shaft in position relative to the shaft 29.

The sealing ring 54 prevents the passage of any lubricant from the gear chamber, indicated generally at 60, past the flanges 52 and 53 of the brake drum into the brake drum housing in which is disposed the shoes 62 and the actuating mechanism 63. Similar sealing means 64 is provided in the base of the bearing cup to prevent the passage of lubricant outwardly from the bearings 58 along shaft 20 into the brake housing. The overhanging portion 65 of the hub 40 of the wheel prevents bearing lubricant for bearings 32 from passing outwardly into the gear housing, although no positive seal is necessary at this point. A suitable lubricant fitting 66 is provided in the outer face of the wheel and communicates with the duct 67 leading to the space between the bearings 32.

Referring in detail to Figure 3, the bearing cup 57 is provided with an angled surface 70 into which is tapped an elbow member 72 communicating with a suitable duct 73 which extends into the interior of the cup 57 intermediate the bearings 58 and the sealing means 64. The elbow 72 is provided with a connection 74 leading outwardly through the brake closure plate 36, and provided with a suitable lubricant nipple whereby lubricant may be forced into the interior of the cup 57 for lubricating the bearings 58.

It will thus be apparent that the axle may be assembled by first passing the shaft 20 through the bearing cup 57 which has been bolted to the flange 56 and through the opening in the closure plate 36 into engagement with the differential case 16. The bearings 58 are then placed in position and the pinion 23 secured to the end of the shaft 20. The shaft 29 is also secured in position by welding or the like, as indicated at 75. The wheel is assembled with the ring gear 45 and the brake drum 48 rigidly secured thereto, and is then mounted over the bearings 32 upon the end 30 of the shaft 29, the ring gear 45 moving into meshing engagement with the pinion 23. Preferably, the gears 23 and 45 are provided with lubricant prior to assembly, and after assembly, the bearings 32 and 58 are lubricated in the manner described. Any centrifugal force tending to throw lubricant from the gear chamber 60 radially outwardly will not discharge this lubricant past the flange surfaces 52 and 53 due to the sealing means 54, and also due to the relatively close fit between these flanges and the corresponding faces at the outer periphery of the plate 55. This seal, together with the seal 64 effectively prevents any lubricant from entering the interior of the brake housing.

Also, it will be noted that the closure plate 36 substantially completely encloses the inner face of the brake drum and thereby prevents any substantial portion of dirt or moisture from entering into the brake drum housing from this side of the drum. Thus, with this particular construction, the lubricants for the bearings and gears are effectively sealed from any braking surfaces while the assembly is so designed that the parts may be removed and assembled with facility and without the detachment of any considerable number of parts.

The wheel spider 33 is provided with a plurality of radially extending integral projecting portions 80 disposed at circumferentially spaced intervals about its outer periphery, and terminating in radially extending transverse walls 82 having supporting ribs 83 at the inboard side thereof. These spoke-like projections are disposed intermediate the bolts 50 which secure the brake drum 48 to the inboard side of the spider about the head flange 49. Extending laterally outwardly from the transverse walls 82 are U-shaped socket portions, indicated generally at 84, which are adapted to receive centrally thereof, the clamping bolts 85 extending through the walls 82. Each of the clamping bolts 85 is provided with a rim lug 86 adapted to engage the beaded edge of a tire rim 87 to force the beveled gutter of the rim into fixed position on the wedge surface 88 formed at the outer ends of the walls 82.

The lug is moved inwardly on the bolt 85 by means of the nut 89 threaded over the extending end of the bolt, and the lug is provided with laerally offset seating portions engaging the axially extending shoulders 90 which define the upper limits of the socket 84, whereby it is moved axially inwardly toward the wall 82. The rim 87 is adapted to carry a pneumatic tire or the like, and the valve stem of such a tire may be let out between adjacent spoke connections 80. It is to be understood, of course, that other types of rims might be secured to the wheel spider, for example, solid rubber tires, semi-pneumatic tires, or even metal wheel rims with ground engaging lugs or the like suitable for high traction purposes in field work.

In the larger sizes of industrial tractors, the loads carried may sometimes be so large as to require a dual tire support for the axle. Such an embodiment of the invention is disclosed in Figure 4 in which the wheel spider 33' carrying the internal gear 45 and the brake drum 48 is provided with circumferentially spaced projections 100 having a central radially extending wall 102 in which an elongated clamping bolt 103 is carried, and having U-shaped sockets 104 and 105 extending in opposite directions from opposite sides of the wall 102. Each of these sockets has spaced parallel seating shoulders 106 and 107 adapted to receive and support the tire lugs 108 and 109. The shoulders 106 and 107 terminate adjacent the central transverse wall 102 in raised pilot portions 110 and 112 against which the spacing rings 113 are adapted to abut. The manner in which the lugs are drawn axially inwardly toward the wall 102 to thereby chord the rims 114 radially outwardly on the wedge surfaces of the lugs, while at the same time moving the rims into fixed spaced co-planar alignment with respect to the central plane of the wheel, is described in detail in the reissue patent of Frederick W. Burger, No. 19,885, of March 10, 1936.

Suffice it to say that upon tightening of the nut 115 on the bolt 103, the lugs 108 and 109 are moved axially on the shoulders 106 and 107 toward the pilots 110 and 112. The rims are thereby carried inwardly against the spacing rings 113, and when the rings hit the pilots, the rims are wedged radially outwardly to chord them in fixed lateral position on the wheel 33'.

It will therefore be apparent that with the present construction, either single or dual wheel mounting may be provided for supporting the axle, and that the rims may be separately demounted from the wheel spiders without requiring the disassembling of any other portions of the structure.

It should also be noted that the housing arms 5 and 9 each provide for integral spring supporting portions 26 and jack shaft supporting portions 28, and at the same time provide flanges for supporting the brake plate 36 and the sealing disc 55 and bearing cup 57, and can be cast as a single unit and can be accurately machined to provide for the proper location and disposition of these parts.

While I have shown and described only one form which the present invention may take, it is to be understood that it obviously can be embodied in other modifications, and I therefore do not intend to be limited to the exact details shown and described, but only insofar as defined by the scope and spirit of the appended claims.

I claim:

1. In combination, a housing having two parallel shaft openings, a dead axle spindle extending through one of said openings, a traction wheel rotatably mounted thereon and having an internal ring gear and a laterally and radially spaced brake drum, a back plate for said drum supported by said housing, a jack shaft extending freely through said other opening and having a pinion engaging said ring gear, means carried by said housing for rotatably supporting said jack shaft within the plane of said drum including means for sealing said gears and support from said drum, and brake means in said drum supported on said back plate.

2. In combination, an axle housing having a differential supporting portion and an extending tubular axle arm, an integral offset portion at the end of said arm having a dead axle spindle therein, a wheel rotatably mounted on said spindle and having an internal gear and an axially and radially spaced brake drum, a jack shaft extending through said arm and having a pinion at the end thereof engaging said ring gear, means carried by said housing forming a closure about said gears and including bearing means rotatably supporting said jack shaft within the plane of said drum, sealing means carried by said closure means and engaging an annular portion of said drum for sealing said drum from said gear housing, and a back plate carried by said housing and enclosing said drum.

3. In combination, an axle housing having laterally offset shaft openings at the extremity of the arm thereof, a jack shaft in one opening, a dead axle shaft in the other opening, a back plate secured to the end of said housing, a second plate parallel to said back plate and spaced axially outwardly thereof about said dead axle shaft opening, said second plate having peripheral oil sealing means and having an outwardly directed cup-like portion receiving the end of said jack shaft and having bearings therein, sealing means for said jack shaft carried by said portion, a pinion secured to said jack shaft outwardly of said bearings, and a wheel rotatably mounted on said dead axle shaft and having a ring gear engaged by said pinion and a brake drum disposed within the periphery of said back plate, said peripheral sealing means engaging an annular portion of said drum for preventing lubricant from said gears and wheel bearing from passing into the interior of said drum.

4. The combination of claim 3 characterized by means projecting through said back plate and communicating with said cup-like portion for admitting lubricant to said bearings and gears.

5. In an axle construction, an axle housing arm having a belled and flanged end for bolting to a similar end of a second arm to form a differential housing, said arm having an extending tubular portion, a laterally offset extension at the end of said tubular portion having a spring supporting surface and a parallelly extending tubular portion provided with axially spaced radial flange portions, a brake closure plate secured to one flange portion, a sealing plate secured to the other flange portion and having an integral bearing cup disposed adjacent the end of said first tubular portion in alinement therewith, a jack shaft extending through said arm and rotatably supported in said cup, a dead shaft secured in said offset tubular portion, a wheel rotatably supported on said dead shaft and driven from said jack shaft, a brake drum carried by said wheel and enclosed by said closure plate, and sealing means carried by said sealing plate engaging a portion of said drum for preventing entrance of lubricant into the drum chamber.

6. In an axle construction, an axle housing arm having a belled and flanged end for bolting to a similar end of a second arm to form a differential housing, said arm having an extending tubular portion, a laterally offset extension at the end of said tubular portion having a spring supporting surface and a parallelly extending tubular portion provided with axially spaced radial flange portions, said tubular arm receiving a jack shaft supported at one end in said differential housing, a stub shaft secured in said offset tubular portion, a pinion on the outer end of said jack shaft, a wheel rotatably supported on said stub shaft and having an internal ring gear engaged by said pinion, plates carried by said flanges and defining therebetween an annular outwardly opening channel, brake means in said channel supported on one of said plates, a brake drum on said wheel extending about said channel, and sealing means on the other plate engaging a portion of said drum.

7. An axle housing arm for an axle assembly comprising a tubular member having an outwardly belled portion at one end, the opposite end of said member having an integral laterally offset spring supporting portion and having a tubular extension parallel to said arm and projecting axially therebeyond, said extension having axially spaced radial flanges disposed outwardly of said spring supporting portion.

8. The arm of claim 7 wherein one of said flanges is in a plane coplanar with the outer end of said arm and the other flange is in a plane spaced outwardly thereof.

9. In combination, a housing having two parallel shaft openings, a dead axle spindle extending through one of said openings, a wheel rotatably mounted thereon and having an internal ring gear and laterally spaced brake drum, a back plate for said drum supported by said housing, a jack shaft extending freely through said other opening and having a pinion gear engaging said ring gear, and means carried by said housing for rotatably supporting said jack shaft within the plane of said drum including means for sealing said gears and support from the drum.

10. In combination, a housing having two parallel shaft openings, a dead axle spindle extending through one of said openings, a wheel rotatably mounted thereon and having an internal ring gear and a laterally spaced brake drum, a back plate for said drum supported by said housing, a jack shaft extending freely through said other opening and having a pinion engaging said ring gear and means secured to said housing about said spindle opening for rotatably supporting said jack shaft and including peripheral sealing means between said drum and said gear.

11. In combination, a housing having two parallel shaft openings, a dead axle spindle extending through one of said openings, a wheel rotatably mounted thereon and having an internal ring gear and a laterally spaced brake drum, a back plate for said drum supported by said housing, said drum having a radially inwardly spaced annular shoulder at the gear side thereof, a jack shaft extending freely through said other opening and having a pinion engaging said ring gear, and means carried by said housing rotatably supporting said jack shaft and including sealing means engaging said shoulder to prevent passage of lubricant from said gears to said drum.

12. In combination an axle housing having an extending tubular arm provided with a laterally offset tubular extension, a radial flange on said extension in the plane of the arm extremity, a back plate secured thereto, a dead axle spindle in said extension, a wheel rotatably journalled on said spindle and having an internal ring gear and a laterally inwardly spaced brake drum, a jack shaft freely rotatable in said arm having a pinion gear engaging said ring gear, a second radial flange at the extremity of said extension, and means secured thereto rotatably supporting said shaft and including means sealing said gears from said drum.

ELMER J. DUNHAM.